United States Patent
Wang et al.

(10) Patent No.: US 12,086,351 B2
(45) Date of Patent: Sep. 10, 2024

(54) TOUCH SENSOR, DISPLAY PANEL, AND ELECTRONIC DEVICE

(71) Applicant: Wuhan China Star Optoelectronics Semiconductor Display Technology Co., Ltd., Hubei (CN)

(72) Inventors: Yanan Wang, Hubei (CN); Yalong Ma, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/781,014

(22) PCT Filed: May 10, 2022

(86) PCT No.: PCT/CN2022/091961
§ 371 (c)(1),
(2) Date: Oct. 19, 2023

(87) PCT Pub. No.: WO2023/197388
PCT Pub. Date: Oct. 19, 2023

(65) Prior Publication Data
US 2024/0160310 A1 May 16, 2024

(30) Foreign Application Priority Data
Apr. 12, 2022 (CN) .......................... 202210379208.3

(51) Int. Cl.
*G06F 3/044* (2006.01)
*G06F 3/041* (2006.01)

(52) U.S. Cl.
CPC ........ *G06F 3/04164* (2019.05); *G06F 3/0412* (2013.01); *G06F 3/0445* (2019.05); *G06F 3/0446* (2019.05); *G06F 2203/04111* (2013.01)

(58) Field of Classification Search
CPC .. G06F 3/04164; G06F 3/0445; G06F 3/0446; G06F 3/0412; G06F 2203/04111
See application file for complete search history.

(56) References Cited

U.S. PATENT DOCUMENTS

| | | | |
|---|---|---|---|
| 2018/0120977 A1 | 5/2018 | Shim | |
| 2023/0118806 A1* | 4/2023 | Su | H01L 27/1259 345/174 |
| 2024/0094855 A1* | 3/2024 | Zhang | G06F 3/0446 |

FOREIGN PATENT DOCUMENTS

| | | |
|---|---|---|
| CN | 108958541 | 12/2018 |
| CN | 109121399 | 1/2019 |

(Continued)

OTHER PUBLICATIONS

International Search Report and the Written Opinion Dated Nov. 25, 2022 From the International Searching Authority Re. Application No. PCT/CN2022/091961 and Its Translation Into English. (19 Pages).

*Primary Examiner* — Deeprose Subedi (57) ABSTRACT

A touch control sensor, a display panel, and an electronic device are disclosed. The display panel includes a first conductive layer, a plurality of first auxiliary electrodes, a plurality of bridge parts, and a second conductive layer. The second conductive layer is disposed on a side of the first conductive layer and includes a plurality of first touch control electrodes and a plurality of second touch control electrodes. Each of the first touch control electrodes includes a plurality of first touch control units. Each of the bridge parts is connected between two adjacent first touch control units. Each of the first auxiliary electrodes is parallelly connected to the corresponding first touch control electrode or the corresponding second touch control electrode.

20 Claims, 7 Drawing Sheets

(56) References Cited

FOREIGN PATENT DOCUMENTS

| | | |
|---|---|---|
| CN | 109904199 | 6/2019 |
| CN | 110034168 | 7/2019 |
| CN | 113853681 | 12/2021 |
| WO | WO 2020/029121 | 2/2020 |

* cited by examiner

TOUCH SENSOR, DISPLAY PANEL, AND ELECTRONIC DEVICE

RELATED APPLICATIONS

This application is a National Phase of PCT Patent Application No. PCT/CN2022/091961 having International filing date of May 10, 2022, which claims the benefit of priority of Chinese Patent Application No. 202210379208.3 filed on Apr. 12, 2022. The contents of the above applications are all incorporated by reference as if fully set forth herein in their entirety.

FIELD AND BACKGROUND OF THE INVENTION

The present disclosure relates to a field of display technologies, and more particularly, to a touch sensor, a display panel, and an electronic device.

With continuous development of display screen technologies, touch control panels, as known as one of electronic input devices, have become the simplest, the most convenient, and the most natural human-computer interaction. The touch control panels have many advantages such as good durability and fast response times. Furthermore, the touch control panels can save space for panels, and is easy to operate, which is in line with a development trend of electronic products having a large display area and a thin and light body.

Generally, touch control panels include a touch control driving electrode and a touch control sensing electrode. One of the touch control sensing electrode or the touch control driving electrode is connected by a bridge to form a channel, and the other one of the touch control sensing electrode or the touch control driving electrode is directly connected to form another channel. The touch control sensing electrode and the touch control sensing electrode intersect each other to form a touch control sensor. When the touch control sensor detects finger touches, the touch control sensor confirms touch positions according to changes in a number of signals, thereby realizing a touch control function.

Commonly, in touch control structures, a bridge is formed with a first metal layer, and a touch control driving electrode and a touch control sensing electrode are formed with a second metal layer. The first metal layer and the second metal layer are separated from each other by an insulating layer. To increase a number of signals of touch sensors, the touch sensors disposed on a same layer are designed to make the touch control driving electrode and the touch control sensing electrode have a relatively great electrical resistance, which increases power consumption of a touch control chip.

SUMMARY OF THE INVENTION

Embodiments of the present disclosure provide a touch control sensor, a display panel, and an electronic device to solve an issue of an increase in power consumption of a touch control chip.

An embodiment of the present disclosure provides a display panel, comprising a touch control layer, wherein the touch control layer comprises:
a first conductive layer, wherein the first conductive layer comprises a plurality of first auxiliary electrodes and a plurality of bridge parts;
a second conductive layer, wherein the second conductive layer is disposed on a side of the first conductive layer, the second conductive layer comprises a plurality of first touch control electrodes extending along a first direction and a plurality of second touch control electrodes extending along a second direction, the first direction intersects the second direction, at least one of the first touch control electrodes comprises a plurality of first touch control units spaced apart from each other, and at least one of the bridge parts is connected between two adjacent first touch control units; and
an insulating layer, wherein the insulating layer is disposed between the first conductive layer and the second conductive layer, and the insulating layer comprises a plurality of first through-holes;
wherein at least one of the first auxiliary electrodes extends along the first direction and comprises a plurality of first auxiliary units, and at least one of the first auxiliary units is parallelly connected to the corresponding first touch control unit by the corresponding first through-hole;
wherein the first conductive layer comprises a plurality of second auxiliary electrodes, the second auxiliary electrodes are spaced apart from the first auxiliary electrodes, the insulating layer comprises a plurality of second through-holes, and at least one of the second auxiliary electrodes is parallelly connected to the corresponding second touch control electrode by the corresponding second through-hole; and
wherein the first conductive layer comprises a plurality of auxiliary virtual electrodes, at least one of the auxiliary virtual electrodes is disposed between the corresponding first auxiliary electrode and the corresponding second auxiliary electrode, the insulating layer comprises a plurality of third through-holes, and at least one of the auxiliary virtual electrodes is parallelly connected to the corresponding virtual electrode by the corresponding third through-hole.

In some embodiments, at least one of the first auxiliary electrodes is parallelly connected to the corresponding first touch control electrode by the corresponding first through-hole.

In some embodiments, at least one of the second auxiliary electrodes extends along the second direction and comprises a plurality of second auxiliary units, at least one of the second touch control electrodes comprises a plurality of second touch control units and a plurality of connecting parts, at least one of the connecting parts is connected between two adjacent corresponding second touch control units, and at least one of the second auxiliary units is parallelly connected to the corresponding second touch control unit by the corresponding second through-hole.

In some embodiments, an entire surface of at least one of the first auxiliary units is connected to the corresponding first touch control unit by the corresponding first through-hole, and an entire surface of the at least one of the second auxiliary units is connected to the corresponding second touch control unit by the corresponding second through-hole.

In some embodiments, both the first auxiliary units and the second auxiliary units have a grid structure, the grid structure comprises a plurality of grids connected to each other, each of the grids comprises a plurality of edges and a plurality of vertexes, at least one of the first touch control units is directly connected to the edges and the vertexes of the corresponding first auxiliary unit, and at least one of the second touch control units is directly connected to the edges and the vertexes of the corresponding second auxiliary unit.

In some embodiments, a distance between at least one of the second auxiliary units and the connecting part adjacent to the at least one of the second auxiliary units is at least greater than or equal to 1.5 times size of the grids.

In some embodiments, at least one of the first auxiliary units is parallelly connected to the corresponding first touch control unit by the corresponding first through-holes, and at least one of the second auxiliary units is parallelly connected to the corresponding second touch control unit by the corresponding second through-holes.

An embodiment of the present disclosure provides a display panel, comprising a touch control layer, wherein the touch control layer comprises:

a first conductive layer, wherein the first conductive layer comprises a plurality of first auxiliary electrodes and a plurality of bridge parts;

a second conductive layer, wherein the second conductive layer is disposed on a side of the first conductive layer, the second conductive layer comprises a plurality of first touch control electrodes extending along a first direction and a plurality of second touch control electrodes extending along a second direction, the first direction intersects the second direction, at least one of the first touch control electrodes comprises a plurality of first touch control units spaced apart from each other, and at least one of the bridge parts is connected between two adjacent first touch control units; and an insulating layer, wherein the insulating layer is disposed between the first conductive layer and the second conductive layer, and the insulating layer comprises a plurality of first through-holes;

wherein at least one of the first auxiliary units is parallelly connected to the one of the corresponding first touch control unit or the corresponding second touch control unit by the corresponding first through-hole.

In some embodiments, the first conductive layer comprises a plurality of second auxiliary electrodes, the second auxiliary electrodes are spaced apart from the first auxiliary electrodes, the insulating layer comprises a plurality of second through-holes, at least one of the first auxiliary electrodes is parallelly connected to the corresponding first touch control electrode by the corresponding first through-hole, and at least one of the second auxiliary electrodes is parallelly connected to the corresponding second touch control electrode by the corresponding second through-hole.

In some embodiments, at least one of the first auxiliary electrodes extends along the first direction and comprises a plurality of first auxiliary units, at least one of the second auxiliary electrodes extends along the second direction and comprises a plurality of second auxiliary units, at least one of the second touch control electrodes comprises a plurality of second touch control units and a plurality of connecting parts, at least one of the connecting parts is connected between two adjacent corresponding second touch control units, at least one of the first auxiliary units is parallelly connected to the corresponding first touch control unit by the corresponding first through-hole, and at least one of the second auxiliary units is parallelly connected to the second touch control unit by the corresponding second through-hole.

In some embodiments, an entire surface of at least one of the first auxiliary units is connected to the corresponding first touch control unit by the corresponding first through-hole, and an entire surface of at least one of the second auxiliary units is connected to the corresponding second touch control unit by the corresponding second through-hole.

In some embodiments, both the first auxiliary units and the second auxiliary units have a grid structure, the grid structure comprises a plurality of grids connected to each other, each of the grids comprises a plurality of edges and a plurality of vertexes, at least one of the first touch control units is directly connected to the edges and the vertexes of the corresponding first auxiliary unit, and at least one of the second touch control units is directly connected to the edges and the vertexes of the corresponding second auxiliary unit.

In some embodiments, a distance between at least one of the second auxiliary units and the connecting part adjacent to the at least one of the second auxiliary units is at least greater than or equal to 1.5 times size of the grids.

In some embodiments, at least one of the first auxiliary units is parallelly connected to the corresponding first touch control unit by the corresponding first through-holes, and at least one of the second auxiliary units is parallelly connected to the corresponding second touch control unit by the corresponding second through-holes.

In some embodiments, both the first auxiliary units and the second auxiliary units have a grid structure, the grid structure comprises a plurality of grids connected to each other, each of the grids comprises a plurality of edges and a plurality of vertexes, at least one of the first touch control units is directly connected to the edges and the vertexes of the corresponding first auxiliary unit, and at least one of the second touch control units is directly connected to the edges and the vertexes of the corresponding second auxiliary unit.

In some embodiments, at least two adjacent first touch control units are connected to each other by two adjacent corresponding bridge parts, the first conductive layer comprises a plurality of third auxiliary electrodes disposed between the bridge parts adjacent to each other, and at least one of the third auxiliary electrodes is parallelly connected to the corresponding second touch control electrode.

In some embodiments, at least one of the auxiliary units is directly connected to the corresponding bridge part.

In some embodiments, each of the first auxiliary units and the corresponding first touch control unit have a same shape, and each of the second auxiliary units and the corresponding second touch control unit have a same shape.

In some embodiments, the first conductive layer comprises a plurality of auxiliary virtual electrodes, at least one of the auxiliary virtual electrodes is disposed between the corresponding first auxiliary electrode and the corresponding second auxiliary electrode, the second conductive layer comprises a plurality of virtual electrodes, at least one of the virtual electrodes is disposed between the corresponding first touch control electrode and the corresponding second touch control electrode, the insulating layer comprises a plurality of third through-holes, and at least one of the auxiliary virtual electrodes is parallelly connected to the corresponding virtual electrodes by the corresponding third through-hole.

An embodiment of the present disclosure further provides an electronic device, comprising any of the above display panels.

Regarding the Beneficial Effects

In a touch control sensor, a display panel, and an electronic device provided by embodiments of the present disclosure, at least one of a plurality of first auxiliary electrodes disposed on a same layer as a plurality of bridge parts is parallelly connected to one of a corresponding first touch control electrode or a corresponding second touch control electrode by a corresponding first through-hole.

Therefore, electrical resistance of the first touch control electrode or electrical resistance of the second touch control electrode can be reduced, thereby reducing power consumption of a touch control chip.

BRIEF DESCRIPTION OF THE SEVERAL VIEWS OF THE DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DESCRIPTION OF SPECIFIC EMBODIMENTS OF THE INVENTION

Hereinafter preferred embodiments of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure. It should be noted that described embodiments are merely used to construct the present disclosure and are not intended to limit the present disclosure. In the present disclosure, unless further description is made, terms such as "top" and "bottom" usually refer to a top of a device and a bottom of a device in an actual process or working status, and specifically, to the orientation as shown in the drawings. Terms such as "inside" and "outside" are based on an outline of a device.

Figure 1:
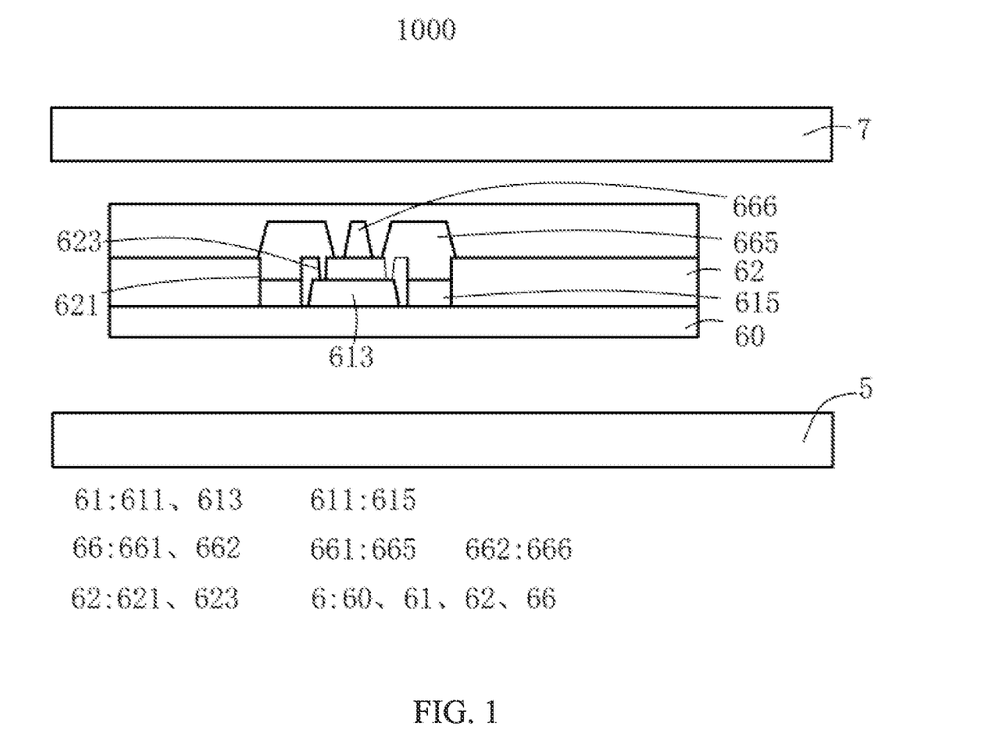
FIG. 1 is an exploded schematic view showing a display panel provided by an embodiment of the present disclosure.
Figure 2:
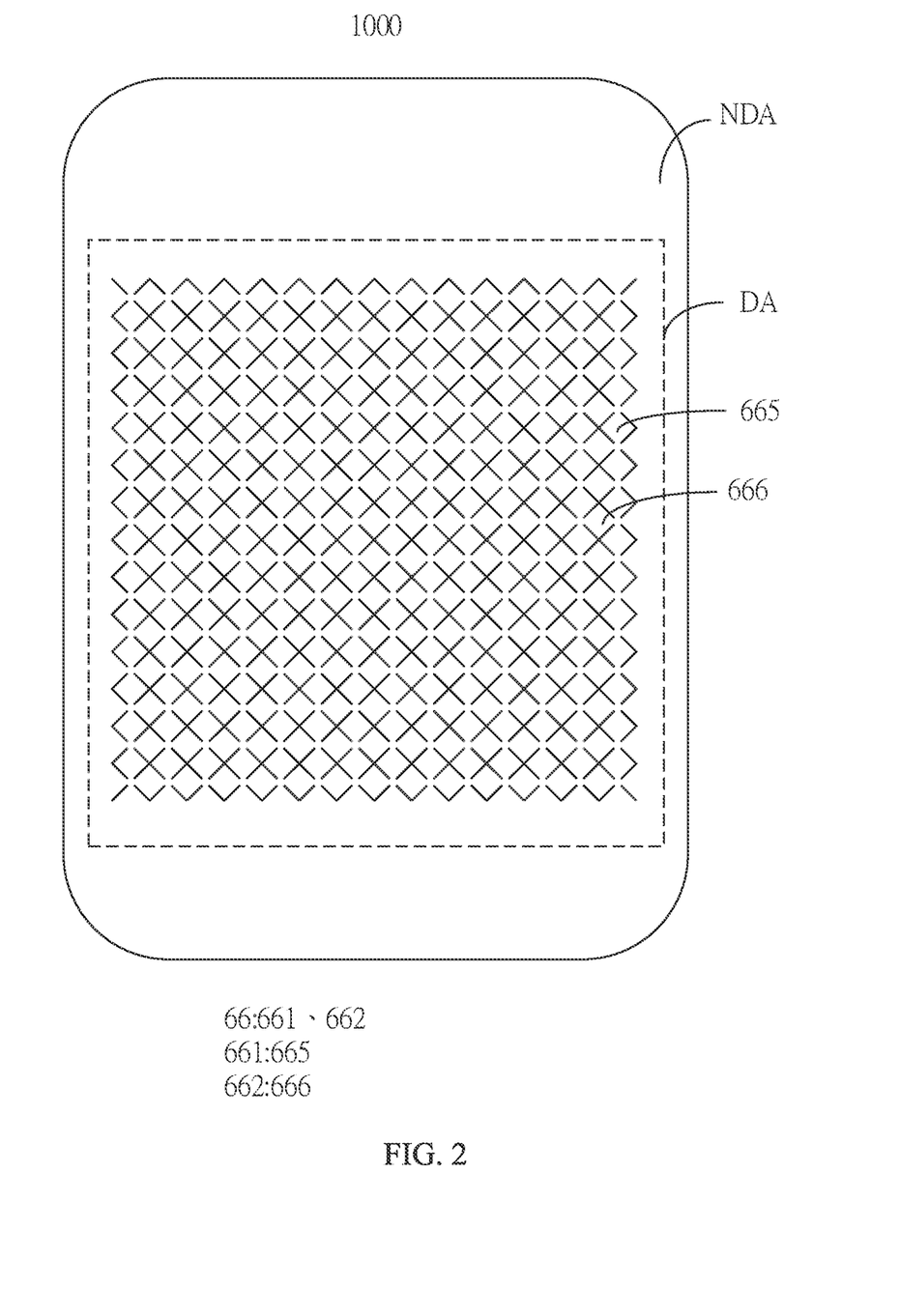
FIG. 2 is a structural schematic view showing a second conductive layer of the display panel in FIG. 1.

As shown in FIG. 1 and FIG. 2, an embodiment of the present disclosure provides a display panel 1000. The display panel 1000 may be an organic light-emitting diode (OLED) display panel, a liquid crystal display (LCD) panel, a mini light-emitting diode (mini LED) display panel, or a micro light-emitting diode (micro LED) display panel. Exemplarily, the display panel 1000 is the OLED display panel.

Please refer to FIG. 2, the display panel 1000 includes a display area DA and a non-display area NDA. The display area DA may be an area where a sub-pixel configured to display images is disposed. The non-display area NDA may be an area where a driving unit, such as a gate driving circuit, configured to provide a driving signal to a pixel driving circuit of the sub-pixel is disposed and where some wires configured to provide a signal to the driving unit is disposed. The non-display area NDA may be defined on at least one side of the display area DA, thereby at least surrounding part of the display area DA.

Figure 4:
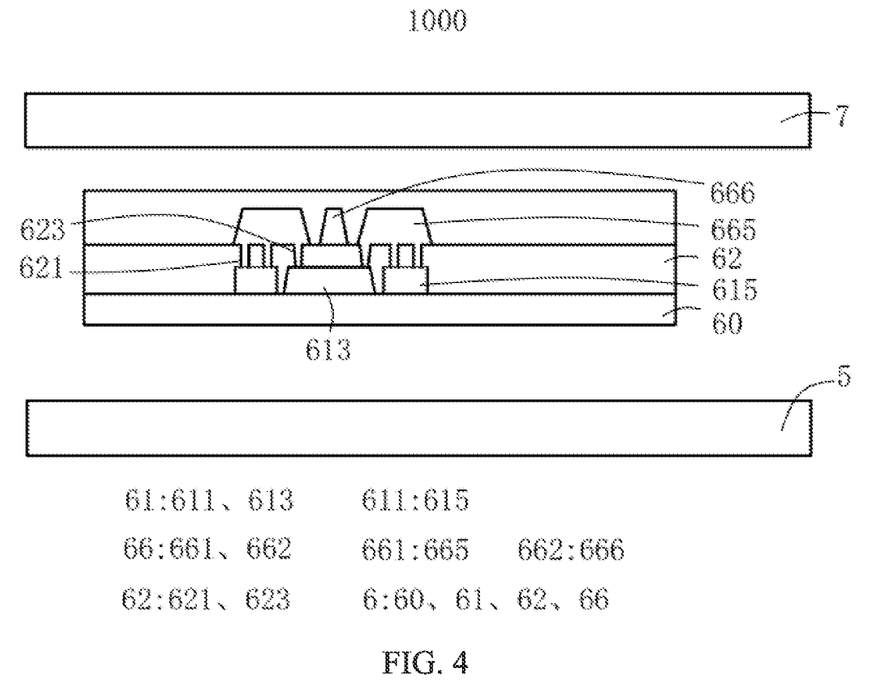
FIG. 4 is an exploded schematic view showing a display panel provided by an embodiment of the present disclosure.

Please refer to FIG. 1, the display panel 1000 includes a substrate, a pixel driving circuit layer disposed on the substrate, a luminescent device layer disposed on the pixel driving circuit layer, an encapsulation layer 5 disposed on the luminescent device layer, a touch control layer 6 disposed on the encapsulation layer 5, and a polarizer 7 disposed on the touch control layer 6. It should be noted that the encapsulation layer 5, the touch control layer 6, and the polarizer 7 as shown in FIG. 1 are separated from each other for ease of description. However, this does not mean that the encapsulation layer 5, the touch control layer 6, and the polarizer 7 are separated from each other in actual display panel structures. FIG. 4 is similar to FIG. 1, and is not described in sequential description again.

The substrate is configured to support layers disposed thereon. The substrate may include a single layer of insulating material such as glass, quartz, or polyresin. Alternatively, the substrate may include multi-layers of insulating layers such as double layers of polyresin. The substrate may be a rigid substrate or a flexible substrate.

The pixel driving circuit layer is configured to drive the luminescent device layer to emit light. The pixel driving circuit layer is disposed in the display area DA, and includes a semiconductor layer and multiple metal layers, thereby forming multiple pixel driving circuits. Exemplarily, at least one of the pixel driving circuits may include at least one capacitance and multiple thin-film transistors (TFTs).

The luminescent device layer is configured to emit light. The luminescent device layer is disposed in the display area DA, and may include a first electrode, a luminescent layer, and a second electrode. The luminescent layer may include an organic substance layer. The organic substance layer of the luminescent layer may include an organic luminescent layer, and may include one of "a hole injection layer and a hole transport layer" or "an electron injection layer and an electron transport layer". The first electrode may be an anode. The second electrode may be a cathode. The first electrode is electrically connected to the pixel driving circuits. Therefore, the pixel driving circuits can drive the first electrode and the second electrode to together excite the luminescent layer to emit light.

The encapsulation layer 5 is configured to encapsulate the luminescent device layer. The encapsulation layer 5 may include at least one inorganic encapsulation layer and at least one organic encapsulation layer. Exemplarily, the encapsulation layer 5 may include a first inorganic encapsulation layer, a second inorganic encapsulation layer, and an organic encapsulation layer disposed between the first inorganic encapsulation layer and the second inorganic encapsulation layer.

The touch control layer 6 is configured to realize a touch control function, and is disposed in the display area DA. The touch control layer 6 includes a buffer layer 60, a first conductive layer 61, an insulating layer 62, and a second conductive layer 66. The first conductive layer 61 is disposed on the buffer layer 60. The insulating layer 62 is disposed on the first conductive layer 61. The second conductive layer 66 is disposed on the insulating layer 62.

The buffer layer 60 is configured to protect the encapsulation layer 5. The buffer layer 60 may be an inorganic layer or a composite layer.

Please together refer to FIG. 1 and FIGS. 3A to 3C, the first conductive layer 61 may have metal material or transparent conductive material. Exemplarily, the first conductive layer 61 may include indium tin oxide (ITO) material. The first conductive layer 61 includes a plurality of first auxiliary electrodes 611 extending along a first direction, a plurality of second auxiliary electrodes 612 extending along a second direction, a plurality of bridge parts 613 extending along the first direction, and a plurality of auxiliary virtual electrodes 614. The first direction and the second direction intersect each other. Exemplarily, the first direction and the second direction are perpendicular to each other. At least one of the auxiliary virtual electrodes 614 is disposed between the corresponding first auxiliary electrode 611 and the corresponding second auxiliary electrode 612. At least one of the first auxiliary electrodes 611 includes a plurality of first auxiliary units 615 spaced apart from each other. At least two adjacent first auxiliary units 615 are directly connected to each other by the corresponding bridge parts 613. The auxiliary second electrodes 612, the first auxiliary electrodes 611, and the bridge parts 613 are spaced apart from each other. At least one of the second auxiliary electrodes 612 includes a plurality of second auxiliary units 616 spaced apart from each other. At least two adjacent second auxiliary units 616 are separated from each other by two adjacent corresponding bridge parts 613. Exemplarily, at least one of the first auxiliary units 615 and at least one of the second auxiliary units 616 both have a rhombus grid structure. The grid structure includes a plurality of grids connected to each other. A distance between at least one of the second auxiliary units 616 and the corresponding bridge part 613 is at least greater than or equal to 1.5 times size of the grids, thereby preventing short-circuiting of the bridge parts 613. Exemplarily, the grids are basically rhombus. Each of the grids includes an edge and a vertex.

The insulating layer 62 may include inorganic material or composite material. The first insulating layer 62 is provided with a plurality of first through-holes 621, a plurality of second through-holes, a plurality of fourth through-holes 623, and a plurality of third through-holes.

Please refer to FIG. 1 and FIG. 2, the second conductive layer 66 may have metal material or transparent conductive material. Exemplarily, the second conductive layer 66 may include ITO material. The second conductive layer 66 includes a plurality of first touch control electrodes 661 (one of a touch control driving electrode TX or a touch control sensing electrode RX) extending along the first direction, a plurality of second touch control electrodes 622 (the other one of the touch control driving electrode TX or the touch control sensing electrode RX) extending along the second direction, and a plurality of virtual electrodes. At least one of the virtual electrodes is disposed between the corresponding first touch control electrode 661 and the corresponding second touch control electrode 662. At least one of the first touch control electrodes 661 includes a plurality of first touch control units 665 spaced apart from each other. At least two adjacent first touch control units 665 are connected to each other by the corresponding bridge part 613 at the corresponding fourth through-hole 623. At least one of the second touch control electrodes 662 includes a plurality of second touch control units 666 and a plurality of connecting parts. At least one of the connecting parts is disposed between two adjacent corresponding second touch control units 666. Exemplarily, at least one of the first touch control units 665 and the first auxiliary unit 615 corresponding thereto have a same shape. At least one of the auxiliary virtual electrodes 614 is parallelly connected to the corresponding virtual electrode by the corresponding third-through-hole.

Please refer to FIG. 1 and FIGS. 3A to 3C again. A plurality of edges and a plurality of vertexes of at least one of the first auxiliary units 615 are respectively and directly connected to a plurality of edges and a plurality of vertexes of the corresponding first touch control unit 665 by the corresponding first through-holes 621. Therefore, an entire surface of at least one of the first auxiliary electrodes 615 is connected to the corresponding first touch control unit 665, which increases a thickness of the first touch control unit 665. As such, the first auxiliary electrode 611 is parallelly connected to the corresponding first touch control unit 661. A plurality of edges and a plurality of vertexes of at least one of the second auxiliary units 616 are respectively and directly connected to a plurality of edges and a plurality of vertexes of the corresponding second touch control unit 666. Therefore, an entire surface of at least one of the second auxiliary units 616 is connected to the corresponding second touch control unit 666, which increases a thickness of the second touch control unit 666. As such, at least one of the second auxiliary electrodes 612 is parallelly connected to the corresponding second touch control electrode 662. It should be noted that, in the present embodiment, "an entire surface" means that each of the first auxiliary units 615 and the corresponding first touch control unit 665 have a relatively large contact area (can be regarded as the first auxiliary unit 615 and the corresponding first touch control unit 665 parallelly connected to each other by multiple connecting points connected to each other). Exemplarily, a ratio of the contact area to an area of the first auxiliary unit 615 is not less than 90%.

The polarizer 7 is configured to alleviate interference in light emitted by the luminescent device layer due to ambient light. The polarizer 7 may be a circular polarizer 7.

A simulation experiment is conducted on two touch control layers having equal area. Electrical resistance of a conventional touch control layer (only a first metal layer is patterned to form a bridge part) is 23.62 units. Electrical resistance of the touch control layer of the present embodiment is 15.28 units. Therefore, compared with the conventional touch control layer, the electrical resistance of the touch control layer of the present embodiment is significantly reduced.

Figure 3A:
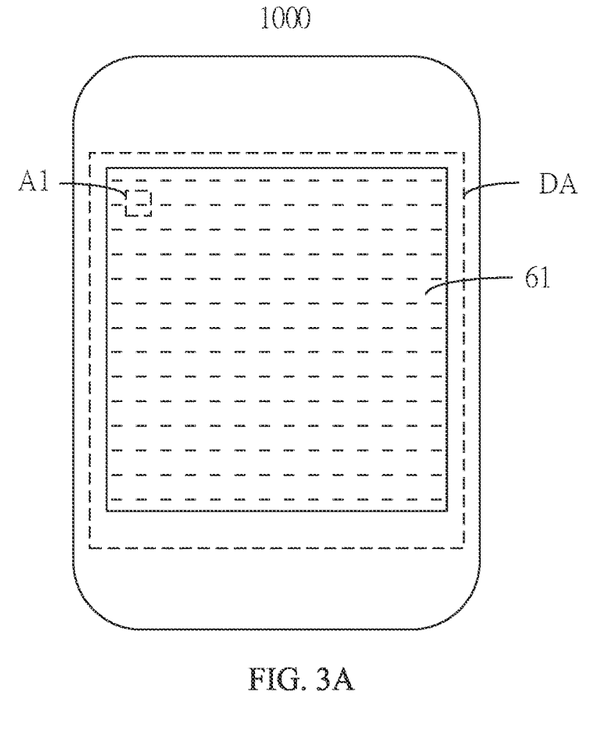
FIG. 3A is a structural schematic view showing a first conductive layer of the display panel in FIG. 1.
Figure 3B:
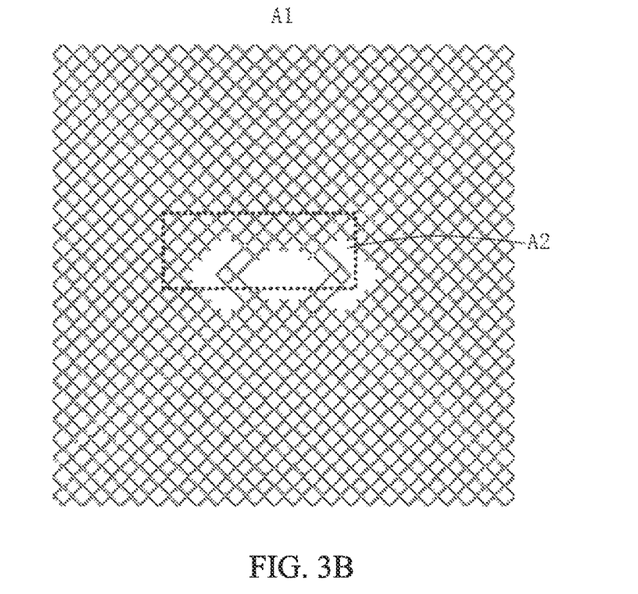
FIG. 3B is an enlarged schematic view showing an area A1 in FIG. 3A.
Figure 3C:
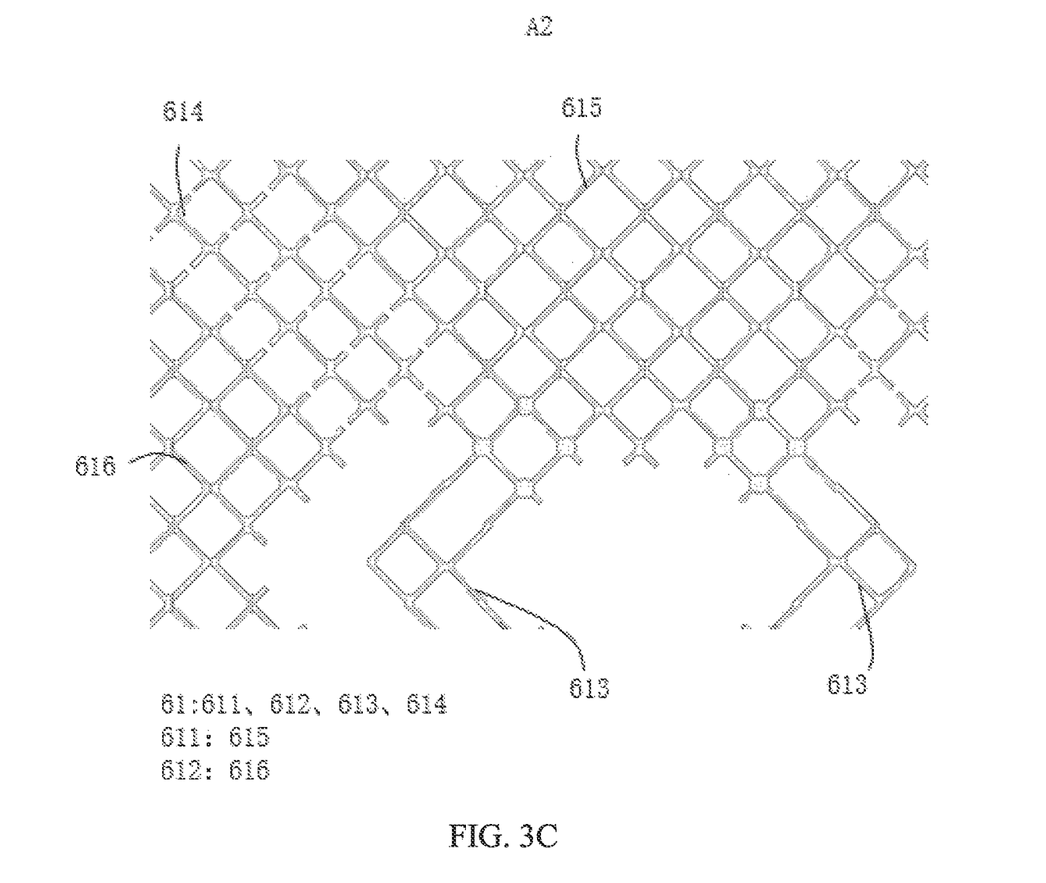
FIG. 3C is an enlarged schematic view showing an area A2 in FIG. 3B.

In the display panel 1000 of the present embodiment, the entire surface of at least one of the first auxiliary units 615, which is disposed on a same layer as the bridge parts 613, is connected to the corresponding first touch control unit 665, which increases the thickness of the first touch control unit 665. Therefore, at least one of the first auxiliary electrodes 611 is parallelly connected to the corresponding first touch control electrode 661. The entire surface of at least one of the second auxiliary units 616, which is disposed on a same layer as the bridge parts 613, is connected to the corresponding second touch control unit 666, which increases the thickness of the second touch control unit 666. Therefore, at least one of the second auxiliary electrodes 612 is parallelly connected to the corresponding touch control electrode 662. By patterning the first conductive layer 61 except for the bridge parts 613 and making the first conductive layer 61 parallelly connected to the corresponding first touch control electrodes 661 and the second touch control electrodes 662, the first conductive layer 61 can be reasonably used, thereby reducing electrical resistance of the first touch control electrodes 661 and electrical resistance of the second touch control electrodes 662. As such, power consumption of a touch control chip is reduced, and a touch report rate is increased.

Figure 5A:
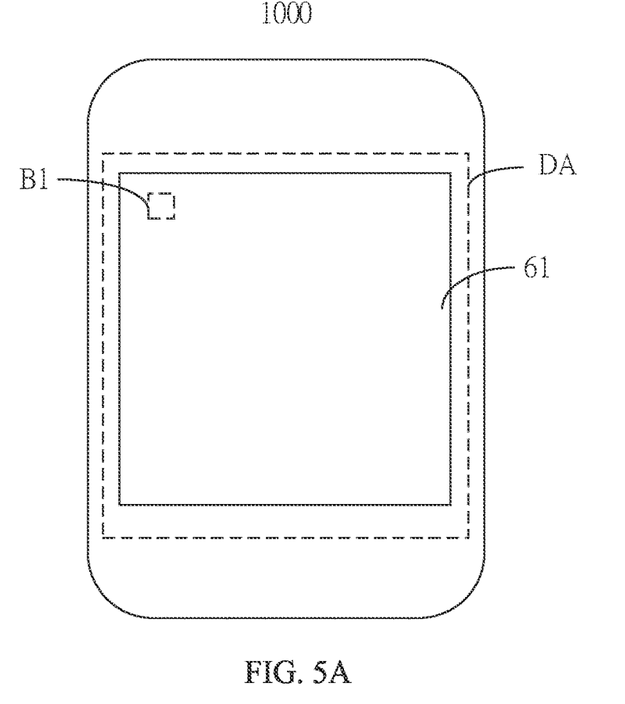
FIG. 5A is a structural schematic view showing a first conductive layer of the display panel in FIG. 4.
Figure 5B:
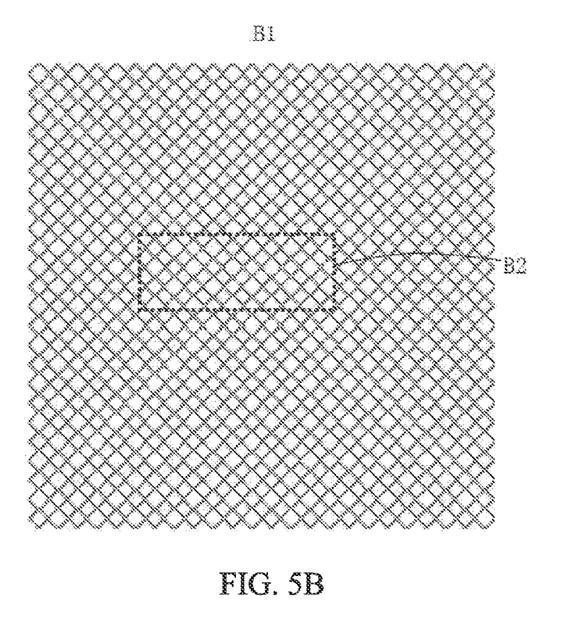
FIG. 5B is an enlarged schematic view showing an area B1 in FIG. 5A.
Figure 5C:
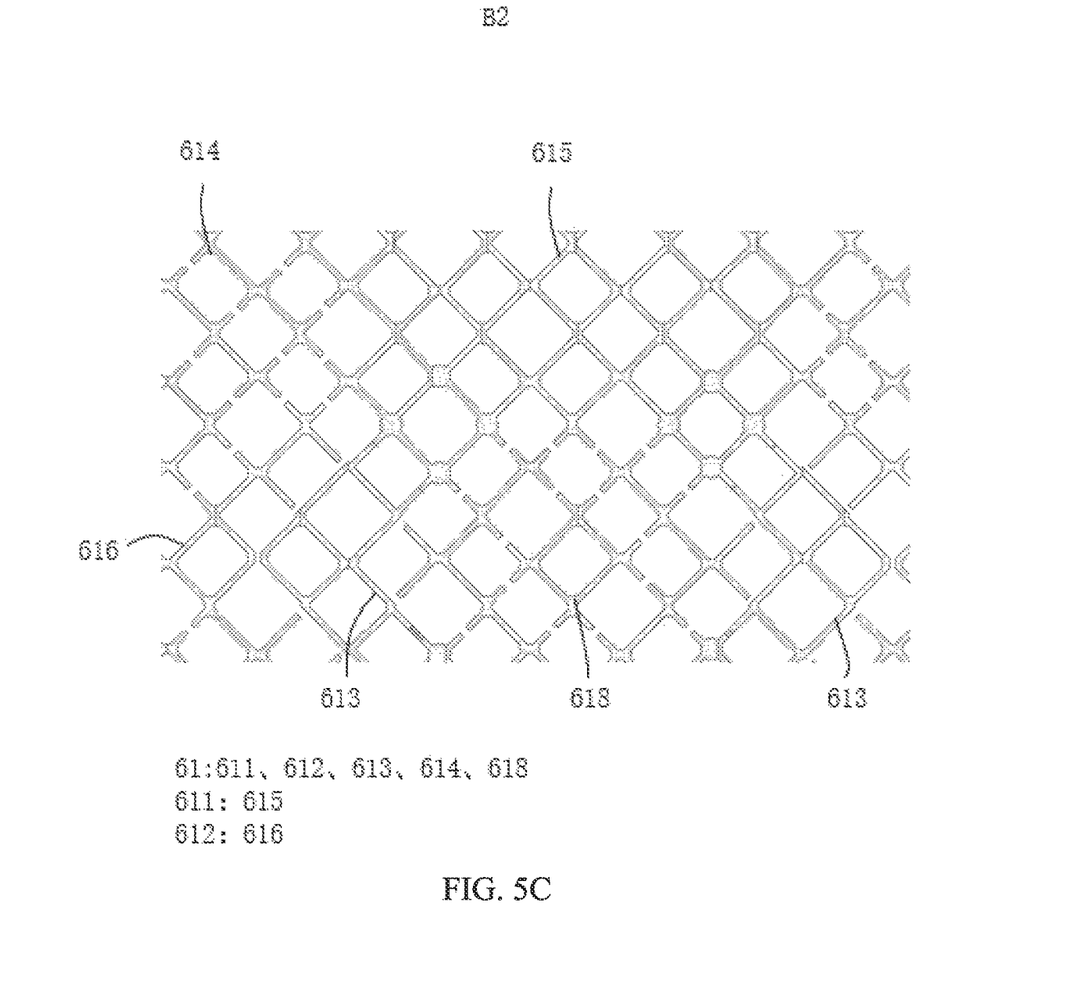
FIG. 5C is an enlarged schematic view showing an area B2 in FIG. 5B.

Please refer to FIGS. 4 to 5C. In other embodiments, at least one of the first auxiliary units 615 is parallelly connected to the corresponding first touch control unit 665 by the first through-holes 621. At least one of the second auxiliary units 616 is parallelly connected to the corresponding second touch control unit 666 by the second through-holes. A plurality of vertexes of at least one of the first touch control units 665 are directly connected to a plurality of vertexes of the corresponding second touch control unit 615 by the corresponding first through-holes 621. A plurality of vertexes of at least one of the second touch control units 666 are directly connected to a plurality vertexes of the corresponding second auxiliary unit 616 by the second through-holes.

Each of the first touch control units 661 and the corresponding first auxiliary electrode 611 are parallelly connected to each other by multiple points. Each of the second touch control units 662 and the corresponding second auxiliary electrode 612 are parallelly connected to each other by multiple points. Therefore, a requirement for a short-circuiting proof design between the second auxiliary touch control electrodes 662 and the bridge parts 613 adjacent thereto can be reduced. Exemplarily, at least one of the second auxiliary units 616 and the bridge parts 613 adjacent thereto are spaced apart from each other. A distance between at least one of the second auxiliary units 616 and the bridge parts 613 adjacent thereto is less than 1.5 times size of the grids. Therefore, electrical resistance of the second touch control electrodes 662 can be further reduced.

The first conductive layer 61 further includes a plurality of third auxiliary electrodes 618. At least one of the third auxiliary electrodes 618 is disposed between at least two adjacent bridge parts 613 which is configured to connect at least two identical touch control units 665 with each other. At least one of the third auxiliary electrodes 618 is parallelly connected to the corresponding second touch control unit 622. Therefore, electrical resistance of the second touch control electrodes 662 can be further reduced.

In other embodiments, it is allowed to make only the first auxiliary electrodes 611 parallelly connected to the first touch control electrodes 661. Alternatively, it is allowed to make only the second auxiliary electrodes 612 parallelly connected to the second touch control electrodes 662. Therefore, electrical resistance of the first touch control units 661 and electrical resistance of the second touch control units 662 can be reduced.

An embodiment of the present disclosure further provides a touch control sensor, including any of the above touch control layers.

An embodiment of the present disclosure further provides an electronic device, including any of the above display panel 1000 or the above touch control sensor. The electronic device has a touch control function. Exemplarily, the electronic device may be devices configured to display videos or stationary images such as a television, a desktop, a monitor, or a billboard. Also, the electronic device may be mobile terminals such as a mobile phone, a tablet computer, a mobile communication terminal, an electronic notepad, an electronic book, a multimedia player, a navigator, or a notebook. Moreover, the electronic device may be wearable electronic devices such as a smartwatch, smartglasses, a virtual reality device, or an augmented reality device.

The above embodiments of the present disclosure have been described in detail, which illustrate principles and implementations thereof. However, the description of the above embodiments is only for helping to understand the technical solution of the present disclosure and core ideas thereof, and it is understood by those skilled in the art that many changes and modifications to the described embodiments can be carried out without departing from the scope and the spirit of the disclosure that is intended to be limited only by the appended claims.

What is claimed is:

1. A display panel, comprising a touch control layer, wherein the touch control layer comprises:
a first conductive layer, wherein the first conductive layer comprises a plurality of first auxiliary electrodes and a plurality of bridge parts;
a second conductive layer, wherein the second conductive layer is disposed on a side of the first conductive layer, the second conductive layer comprises a plurality of first touch control electrodes extending along a first direction and a plurality of second touch control electrodes extending along a second direction, the first direction intersects the second direction, at least one of the first touch control electrodes comprises a plurality of first touch control units spaced apart from each other, and at least one of the bridge parts is connected between two adjacent first touch control units; and
an insulating layer, wherein the insulating layer is disposed between the first conductive layer and the second conductive layer, and the insulating layer comprises a plurality of first through-holes;
wherein at least one of the first auxiliary electrodes extends along the first direction and comprises a plurality of first auxiliary units, and at least one of the first auxiliary units is parallelly connected to the corresponding first touch control unit by the corresponding first through-hole;
wherein the first conductive layer comprises a plurality of second auxiliary electrodes, the second auxiliary electrodes are spaced apart from the first auxiliary electrodes, the insulating layer comprises a plurality of second through-holes, and at least one of the second auxiliary electrodes is parallelly connected to the corresponding second touch control electrode by the corresponding second through-hole; and
wherein the first conductive layer comprises a plurality of auxiliary virtual electrodes, at least one of the auxiliary virtual electrodes is disposed between the corresponding first auxiliary electrode and the corresponding second auxiliary electrode, the second conductive layer comprises a plurality of virtual electrodes, at least one of the virtual electrodes is disposed between corresponding first touch control electrode and the corresponding second touch control electrode, the insulating layer comprises a plurality of third through-holes, and at least one of the auxiliary virtual electrodes is parallelly connected to the corresponding virtual electrode by the corresponding third through-hole.

2. The display panel of claim 1, wherein at least one of the first auxiliary electrodes is parallelly connected to the corresponding first touch control electrode by the corresponding first through-hole.

3. The display panel of claim 2, wherein at least one of the second auxiliary electrodes extends along the second direction and comprises a plurality of second auxiliary units, at least one of the second touch control electrodes comprises a plurality of second touch control units and a plurality of connecting parts, at least one of the connecting parts is connected between two adjacent corresponding second touch control units, and at least one of the second auxiliary units is parallelly connected to the corresponding second touch control unit by the corresponding second through-hole.

4. The display panel of claim 3, wherein an entire surface of at least one of the first auxiliary units is connected to the corresponding first touch control unit by the corresponding first through-hole, and an entire surface of the at least one of the second auxiliary units is connected to the corresponding second touch control unit by the corresponding second through-hole.

5. The display panel of claim 4, wherein both the first auxiliary units and the second auxiliary units have a grid structure, the grid structure comprises a plurality of grids connected to each other, each of the grids comprises a plurality of edges and a plurality of vertexes, at least one of the first touch control units is directly connected to the edges and the vertexes of the corresponding first auxiliary unit, and at least one of the second touch control units is directly connected to the edges and the vertexes of the corresponding second auxiliary unit.

6. The display panel of claim 5, wherein a distance between at least one of the second auxiliary units and the connecting part adjacent to the at least one of the second auxiliary units is at least greater than or equal to 1.5 times size of the grids.

7. The display panel of claim 3, wherein at least one of the first auxiliary units is parallelly connected to the corresponding first touch control unit by the corresponding first through-holes, and at least one of the second auxiliary units is parallelly connected to the corresponding second touch control unit by the corresponding second through-holes.

8. A display panel, comprising a touch control layer, wherein the touch control layer comprises:
   a first conductive layer, wherein the first conductive layer comprises a plurality of first auxiliary electrodes and a plurality of bridge parts;
   a second conductive layer, wherein the second conductive layer is disposed on a side of the first conductive layer, the second conductive layer comprises a plurality of first touch control electrodes extending along a first direction and a plurality of second touch control electrodes extending along a second direction, the first direction intersects the second direction, at least one of the first touch control electrodes comprises a plurality of first touch control units spaced apart from each other, and at least one of the bridge parts is connected between two adjacent first touch control units; and
   an insulating layer, wherein the insulating layer is disposed between the first conductive layer and the second conductive layer, and the insulating layer comprises a plurality of first through-holes;
   wherein at least one of the first auxiliary units is parallelly connected to the one of the corresponding first touch control unit or the corresponding second touch control unit by the corresponding first through-hole.

9. The display panel of claim 8, wherein the first conductive layer comprises a plurality of second auxiliary electrodes, the second auxiliary electrodes are spaced apart from the first auxiliary electrodes, the insulating layer comprises a plurality of second through-holes, at least one of the first auxiliary electrodes is parallelly connected to the corresponding first touch control electrode by the corresponding first through-hole, and at least one of the second auxiliary electrodes is parallelly connected to the corresponding second touch control electrode by the corresponding second through-hole.

10. The display panel of claim 9, wherein at least one of the first auxiliary electrodes extends along the first direction and comprises a plurality of first auxiliary units, at least one of the second auxiliary electrodes extends along the second direction and comprises a plurality of second auxiliary units, at least one of the second touch control electrodes comprises a plurality of second touch control units and a plurality of connecting parts, at least one of the connecting parts is connected between two adjacent corresponding second touch control units, at least one of the first auxiliary units is parallelly connected to the corresponding first touch control unit by the corresponding first through-hole, and at least one of the second auxiliary units is parallelly connected to the second touch control unit by the corresponding second through-hole.

11. The display panel of claim 10, wherein an entire surface of at least one of the first auxiliary units is connected to the corresponding first touch control unit by the corresponding first through-hole, and an entire surface of at least one of the second auxiliary units is connected to the corresponding second touch control unit by the corresponding second through-hole.

12. The display panel of claim 11, wherein both the first auxiliary units and the second auxiliary units have a grid structure, the grid structure comprises a plurality of grids connected to each other, each of the grids comprises a plurality of edges and a plurality of vertexes, at least one of the first touch control units is directly connected to the edges and the vertexes of the corresponding first auxiliary unit, and at least one of the second touch control units is directly connected to the edges and the vertexes of the corresponding second auxiliary unit.

13. The display panel of claim 12, wherein a distance between at least one of the second auxiliary units and the connecting part adjacent to the at least one of the second auxiliary units is at least greater than or equal to 1.5 times size of the grids.

14. The display panel of claim 10, wherein at least one of the first auxiliary units is parallelly connected to the corresponding first touch control unit by the corresponding first through-holes, and at least one of the second auxiliary units is parallelly connected to the corresponding second touch control unit by the corresponding second through-holes.

15. The display panel of claim 14, wherein both the first auxiliary units and the second auxiliary units have a grid structure, the grid structure comprises a plurality of grids connected to each other, each of the grids comprises a plurality of edges and a plurality of vertexes, at least one of the first touch control units is directly connected to the edges and the vertexes of the corresponding first auxiliary unit, and at least one of the second touch control units is directly connected to the edges and the vertexes of the corresponding second auxiliary unit.

16. The display panel of claim 10, wherein at least two adjacent first touch control units are connected to each other by two adjacent corresponding bridge parts, the first conductive layer comprises a plurality of third auxiliary electrodes disposed between the bridge parts adjacent to each other, and at least one of the third auxiliary electrodes is parallelly connected to the corresponding second touch control electrode.

17. The display panel of claim 10, wherein at least one of the auxiliary units is directly connected to the corresponding bridge part.

18. The display panel of claim 10, wherein each of the first auxiliary units and the corresponding first touch control unit have a same shape, and each of the second auxiliary units and the corresponding second touch control unit have a same shape.

19. The display panel of claim 9, wherein the first conductive layer comprises a plurality of auxiliary virtual electrodes, at least one of the auxiliary virtual electrodes is disposed between the corresponding first auxiliary electrode and the corresponding second auxiliary electrode, the second conductive layer comprises a plurality of virtual electrodes, at least one of the virtual electrodes is disposed between the corresponding first touch control electrode and the corresponding second touch control electrode, the insulating layer comprises a plurality of third through-holes, and at least one of the auxiliary virtual electrodes is parallelly connected to the corresponding virtual electrodes by the corresponding third through-hole.

20. An electronic device, comprising the display panel of claim 8.

\* \* \* \* \*